United States Patent
Schafstein (10) Patent No.: US 6,274,073 B1
(45) Date of Patent: Aug. 14, 2001

(54) PROCESS FOR PRODUCING A PIPE FITTING CONSISTING OF THERMALLY WELDABLE MATERIAL

(75) Inventor: Jürgen Schafstein, Remscheid (DE)

(73) Assignee: Manibs Spezialarmaturen GmbH & Co. KG, Remscheid (DE)

( * ) Notice: Subject to any disclaimer, the term of this patent is extended or adjusted under 35 U.S.C. 154(b) by 0 days.

(21) Appl. No.: 09/194,954
(22) PCT Filed: May 9, 1997
(86) PCT No.: PCT/EP97/02377
§ 371 Date: Dec. 7, 1998
§ 102(e) Date: Dec. 7, 1998
(87) PCT Pub. No.: WO97/47913
PCT Pub. Date: Dec. 18, 1997

(30) Foreign Application Priority Data

Jun. 12, 1996 (DE) ............................................. 196 23 353
Oct. 31, 1996 (DE) ............................................. 196 44 055

(51) Int. Cl.[7] ........................... B29C 45/14; B29C 53/02; B29C 53/32
(52) U.S. Cl. ........................... 264/254; 264/255; 264/275; 264/296; 219/535; 219/544
(58) Field of Search ................................... 264/254, 250, 264/255, 275, 259, 248, 249, 296; 219/535, 544; 29/610.1, 611, 613, 618

(56) References Cited

U.S. PATENT DOCUMENTS

| | | | |
|---|---|---|---|
| 3,907,625 | * | 9/1975 | Vogelsanger ......................... 156/253 |
| 3,943,334 | * | 3/1976 | Sturm ..................... 219/544 |
| 3,954,541 | * | 5/1976 | Landgraf ............................. 156/275 |
| 4,455,482 | | 6/1984 | Grandclement . |
| 4,894,521 | * | 1/1990 | Evans .................... 219/535 |
| 4,903,397 | * | 2/1990 | Freidel .................... 29/611 |
| 5,107,098 | * | 4/1992 | D'Auria .............................. 219/548 |
| 5,229,581 | | 7/1993 | D'Auria . |

FOREIGN PATENT DOCUMENTS 195 03 888
A1    8/1995  (DE) .
0119061    9/1984  (EP) .

* cited by examiner

Primary Examiner—Angela Ortiz
(74) Attorney, Agent, or Firm—Friedrich Kueffner (57) ABSTRACT

A process for producing a pipe fitting of thermally weldable material for attachment to or repair of conduits of thermally weldable material. The first injection mold has channels formed as windings and having channel walls. A heating wire is formed to a wavy heating strand which is laid into the first injection mold between the channel walls. A first welding material is introduced into the channels so that a first broad side of the wavy shape of the heating strand is pressed against a first mold surface of the injection mold and an intermediate product with embedded wavy heating strand is formed. The outside surface is formed by the first mold surface against which the heating strand is pressed and provides the contact surface with the conduit in the end product. The first broad side of the wavy shape of the heating strand remains visible at the outer surface of the intermediate product. The intermediate product is placed into a second injection mold for producing a pipe fitting so that the outer surface rests on a second mold surface of the second injection mold. A second welding material is introduced and the contact surface of the pipe fitting is formed. The first broad side of the heating strand remains visible at the contact surface after solidification of the second welding material.

19 Claims, 6 Drawing Sheets

PROCESS FOR PRODUCING A PIPE FITTING CONSISTING OF THERMALLY WELDABLE MATERIAL

BACKGROUND OF THE INVENTION

1. Field of the Invention

The invention pertains to a process for the production of a pipe fitting, at least certain areas of which consist of thermally weldable material (weld material), which fitting is designed for attachment to, or for the repair of, conduits which also consist of thermally weldable material, wherein several windings of at least one electrical heating wire are first laid in the desired welding area of the future contact surface between the pipe fitting and the conduit, wherein contacts are attached, if desired, to the two ends of the heating wire laid in windings, to which contacts an electrical power source is connected during the later welding of the pipe fitting, and then the position of the windings of the heating wire and possibly the position of the contacts are fixed by welding material which is applied in the injection-molding process. Pipe fittings are used for various purposes to be mounted on a previously installed conduit for media such as gas or water, possibly while the conduit is under the pressure of the medium. Appropriate pipe fittings are also used for repair purposes or to connect sections of pipe. At least certain areas of the pipe fitting and of the conduit consist of thermoplastic resin. In these cases, the pipe fitting has a welding area at its contact surface with the conduit, where several windings of at least one electric heating wire are laid. Contacts which serve to connect the wire to a source of electric power when the pipe fitting is welded on at a later time are usually attached to the ends of the heating wire.

2. Description of the Related Art

In the known process, windings of a heating wire of the type in question can be laid directly in the injection mold used to produce the pipe fitting; this wire is thus integrated into the welding material of the pipe fitting during the injection-molding process (CH 528,697 C). The heating wire is surrounded by a plastic jacket, which hinders the flow of heat to the contact surface between the pipe fitting and the conduit. The windings of the heating wire can be laid in the mold as a monofilar or bifilar spiral or as a meander.

It is also known that a plate-shaped intermediate product can be produced out of the heating wire. This is done by winding the heating wire into a bifilar spiral and by connecting these spiral windings to each other by plastic webs (DE 3,810,845 A1). Finally, it is also known that the heating wire can first be brought into the form of a helix, and that the helix can then be embedded in a star-shaped intermediate product of thermoplastic material (DE 7,121,715 U). When the pipe fitting is injection-molded, this star-shaped intermediate product is then integrated into the area of the contact surface with the conduit. The current flowing through the helix leads to maximum heating in the interior of the helix, however, and this beat is therefore unavailable for the welding process with the conduit. The heat which reaches the contact surface is inadequate. In these known pipe fittings, the strength of the weld to the conduit is unreliable. To achieve satisfactory welding results, it is necessary to use a relatively large amount of electrical energy, which is uneconomical.

SUMMARY OF THE INVENTION

The invention is based on the task of providing an economical process for producing pipe fittings of the aforementioned kind, the end products of which can be welded quickly and reliably to conduits. This is achieved according to the invention in that the heating wire, or at least certain sections thereof, is formed into a flat, wavy shape, as a result of which a wavy heating strand is produced as a first step; in that only then are the windings of the wavy heating strand laid in the future welding area of the pipe fitting; wherein, after the injection-molding of the pipe fitting and the solidification of the welding material, one of the broad sides of the wavy shape extends along the contact surface.

The process according to the invention proceeds in two stages. First, the heating wire is brought into the form of a flat, wavy line, as a result of which a special intermediate product is obtained, which is to be referred to below in brief as the "heating strand". The special feature of this heating strand is therefore to be found in its wavy shape, which can also be described as a sine wave. Then, in the second stage of the process, windings of this wavy heating strand are laid in the injection mold in such a way that one of the broad sides of its wavy shape lies directly at the contact surface with the pipe fitting. The wavy shape and its position at the surface ensure the rapid, intense heating of the contact surface even when only a moderate amount of current flows through the strand. The softening and coalescence of the material of the pipe fitting and the conduit lead to a reliable weld after solidification.

Additional measures and advantages of the invention can be derived from the subclaims, from the following description, and from the drawings. The invention is intended to cover all of the novel features and combinations of features which can be derived from them, even if these are not explicitly stated in the claims. The invention is illustrated in the form of an exemplary embodiment in the drawings:

DESCRIPTION OF THE PREFERRED EMBODIMENT

Figure 12:
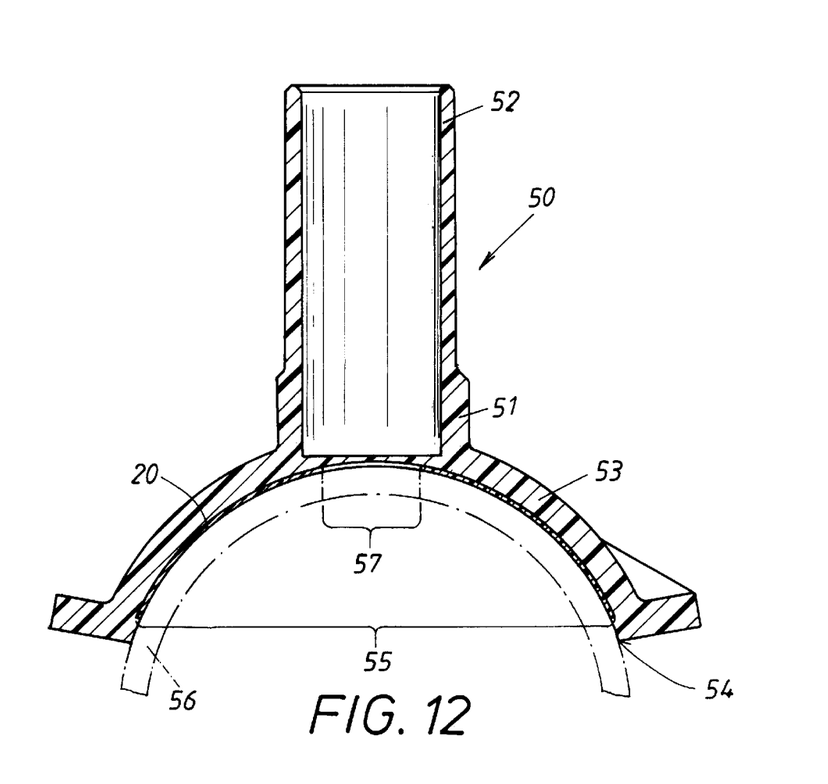
FIG. 12 shows a cross section through a part of the pipe fitting which can be produced in the device of FIG. 10, the position of this end product while in service on a conduit also being indicated.

The goal of the invention to produce a pipe fitting 50 such as that shown by way of example in FIG. 12, at least certain areas of which consist of a weldable material 51, namely, a thermoplastic material, such fittings being designed to be welded to a desired location on a conduit 56, which also consist of a thermally weldable material. This material is to be referred to below in brief as "welding material". To achieve its purpose, pipe fitting 50 has a saddle 53, which, in the mounted state, comes into contact by its contact surface, designated 54, with conduit 56. To produce the weld, a heating wire 10, to be described in greater detail further below, is integrated into a certain welding area 55. This heating wire 10 is first given a special shape, to be presented in greater detail below, and is a component of a special intermediate product 20, which is shown in FIGS. 1–5. During the injection-molding of pipe fitting 50, this intermediate product 20 is integrated into the desired welding area 55, as can be seen in FIG. 12. A pipe fitting of this type can have one or more pipe sockets 52. After the pipe fitting has been welded in place, socket 52 offers access to conduit 56 so that a hole can be drilled through it at the spot indicated by reference number 57.

Figures 6, 7, 8, 9:
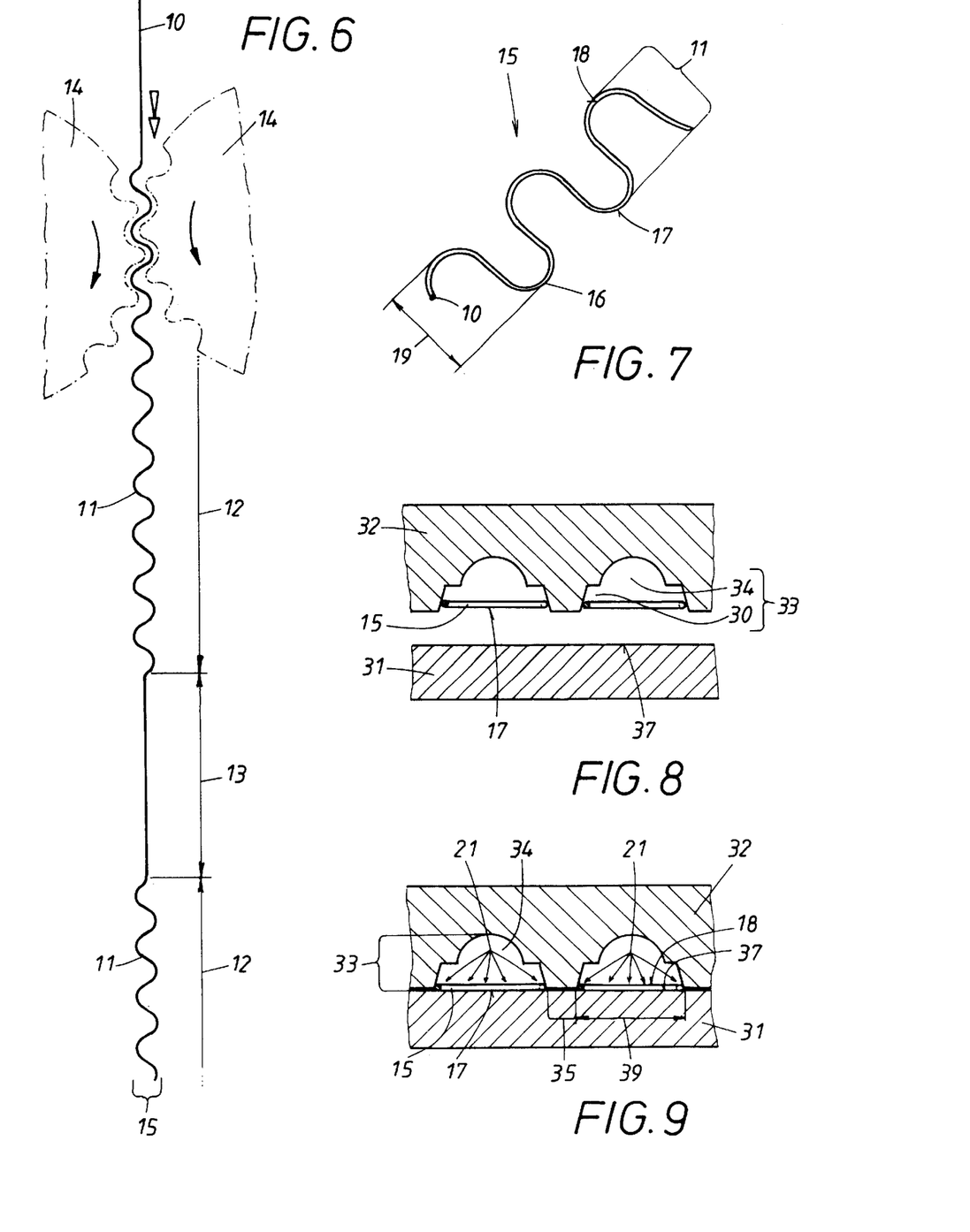
FIG. 6 shows a schematic diagram of several components of a device which is used to give the heating wire a wavy shape, as a result of which a wavy heating strand is obtained.
FIG. 7 shows a perspective view, on an enlarged scale, of part of the wavy heating strand of FIG. 6, which is integrated into the intermediate product of FIGS. 1–5.
FIGS. 8 and 9 show schematic diagrams of parts of an injection mold for the production of the intermediate product shown in FIGS. 1–5, in two different working stages.

As shown in FIG. 6, the starting point is a bare heating wire 10, which does not have any insulating jacket but which does have sections 12, which have been brought into the form of a flat, wavy line 11. Heating wire 10 has at most a conventional, minimal enamel finish. There can be straight sections 13 of wire between wavy sections 12. This wavy intermediate product 15 is shown in perspective in FIG. 7 and is referred to in brief in the following as the "heating strand". The wavy shape 11 of heating strand 15 is produced by conducting the originally straight wire, as can be seen in FIG. 6, between two intermeshing gear wheels 14. Gear wheels 14 have a toothed pro file in the form of the same wavy shape 11. In the present case, the wavy shape is in the form of a sine wave. Straight sections 13 of wire between wavy sections 12 are produced by moving the two gear wheels 14 away from each other while section 13 is passing between them in the direction of the arrow in FIG. 6. Thus the teeth of gear wheels 14 are no longer able to deform heating wire 10.

An injection mold with two mold halves 31, 32 is used to produce intermediate product 20. FIGS. 8 and 9 show enlarged cross sections of this mold. Whereas mold half 31 is designed as an essentially flat plate, the other half 32 of the mold has a channel 33, which is designed here as a flat, monofilar spiral. Channel 33 can be divided into two partial cross sections 30, 34, which serve different functions. One part 30 of the cross section has the form of a trapezoid, the larger trapezoidal side being open toward the other half 31 of the mold. This partial cross section 30 serves to accept wavy heating strand 15. The channel walls of this partial cross section 30 are undercut and grip opposing peaks 16 of heating strand 15, as can be seen in FIG. 7. Inserted heating strand 15 has a certain transverse elasticity and is held in place in partial cross section 30 even while the two halves 31, 32 of the mold are open. In correspondence with the pattern of the windings of channel 33, heating strand 15 itself assumes the form of spiral windings 70 according to FIG. 3.

Figure 1:
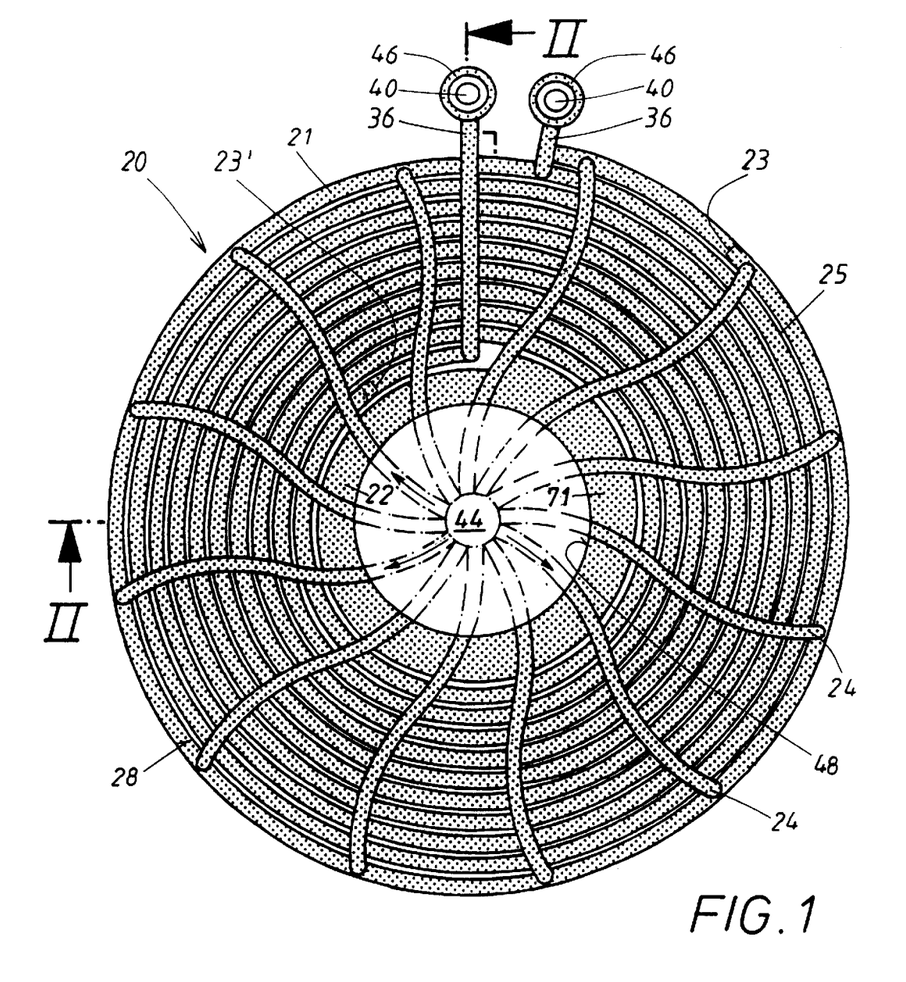
FIG. 1 shows a top view of an intermediate product for a pipe fitting produced in accordance with the invention.
Figure 2:
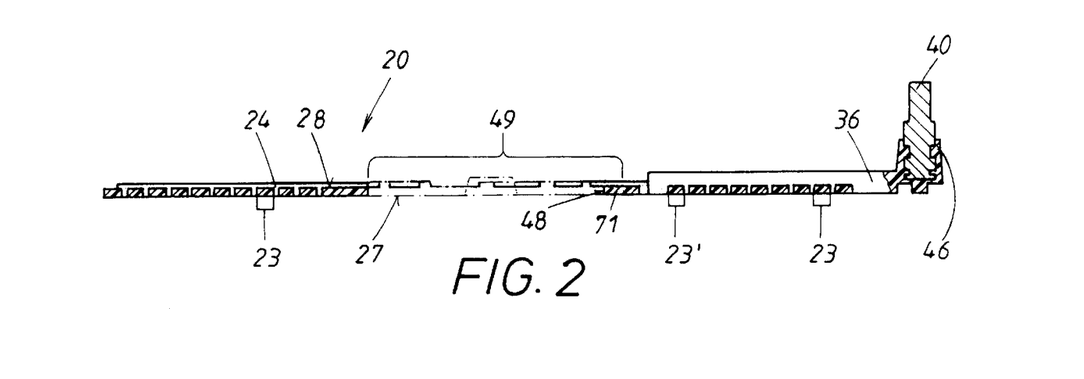
FIG. 2 shows a schematic cross section of the intermediate product of FIG. 1.
Figure 3:
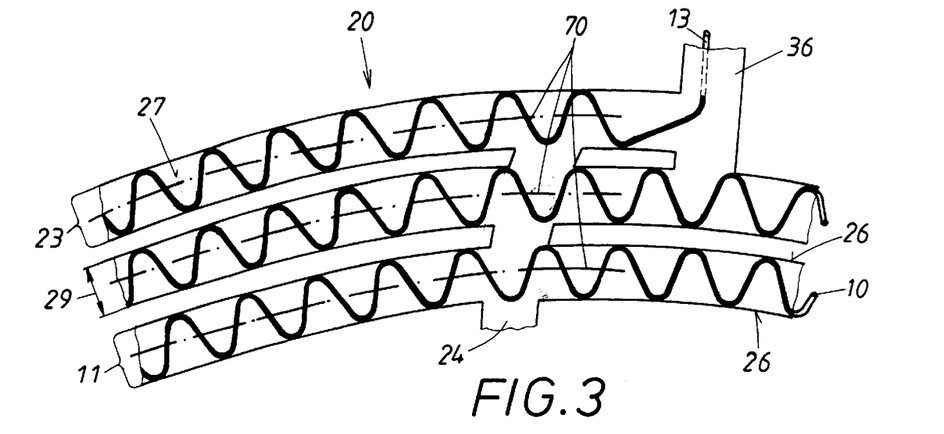
FIG. 3 shows, on an enlarged scale, a bottom view of part of the intermediate product shown in FIG. 1.

A flow cross section 34 in the form of a semicircular arc, which lies above the previously mentioned, trapezoidal partial cross section 30, also belongs to channel 33. After the injection mold has been closed, this partial cross section serves according to FIG. 9 to guide the flow of welding material 21, illustrated by the arrows. When intermediate product 20 is being made, welding material 21 flows toward the upward-facing, broad side 18 of heating strand 15, as a result of which heating strand 15 is pressed against mold surface 37 of adjacent half 31 of the mold. After welding material 21 has solidified in injection mold 31, 32, therefore, intermediate product 20 shown in FIGS. 1–5 is obtained. FIG. 3 shows a bottom view, where wavy shape 11 remains visible on outside surface 27. At the same time, the wavy shape ensures that heating strand 15 is firmly anchored in the welding material of intermediate product 20, which also has the following additional special design feature.

After the plastic material has solidified, a band 23 with the corresponding pattern of windings is formed in the individual spiral turns of channel 33. Width 19 of the wavy shape visible in FIG. 7 is essentially the same as width 39 of the channel used to produce the band, which can be seen in FIG. 9. Therefore, wavy shape 11 passing around individual turns 70 of band 23, as shown in FIG. 3, extends all the way across width 29 of the band, proceeding from one edge of the band to the other. This is also easy to see in the cross section shown in FIG. 5.

Figure 4:
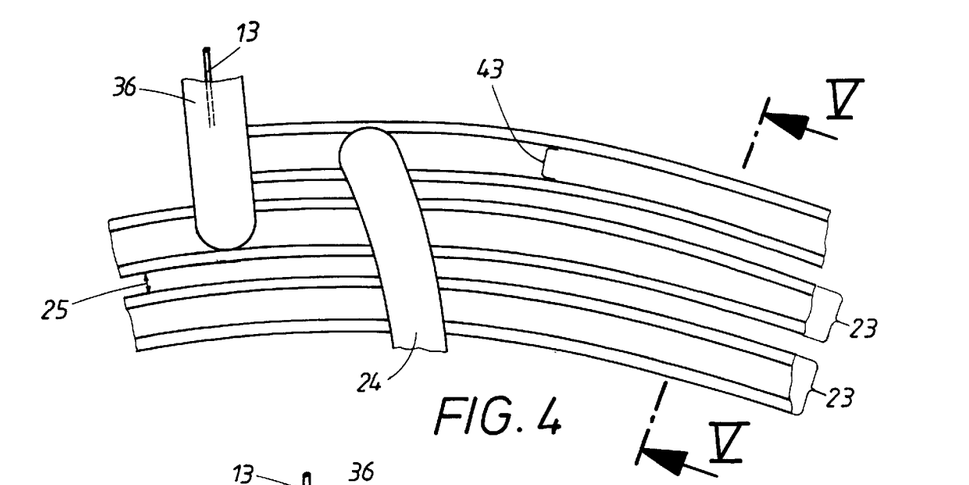
FIG. 4 shows, at the same degree of enlargement, a top view of the part of the intermediate product shown in FIG. 3.
Figure 5:
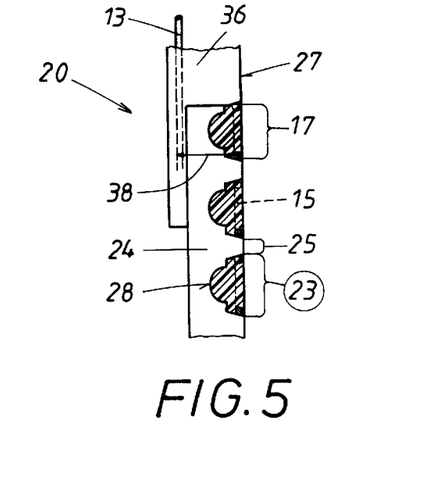
FIG. 5 shows a cross section through the part of the intermediate product shown in FIG. 4 along line V—V of FIG. 4.

As illustrated in FIG. 9, the individual windings of channel 33 are a certain radial distance 35 away from each other, for which reason open gaps 25 are formed in intermediate product 20 between individual windings 23 of the band. These gaps 25 are bridged in intermediate product 20 by connecting ribs 24, as shown in FIG. 1. These connecting ribs 24 are formed by distribution lines, not shown in detail, provided in injection mold 31, 32; these lines proceed from a central gate 44 shown in FIG. 1 and extend essentially in the radial direction across intermediate product 20, which here is in the form of a circular disk. These distribution lines conduct welding material 21 from gate 44 to the individual windings 33 of the channel and ensure that the masses flow primarily into the described flow cross sections 34, which have a rounded profile, which is offset with respect to the cornered profile of receptacle cross sections 30. In the finished band 23, curved, longitudinal beads 43, which are visible in FIG. 4, are thus formed in the area of these flow cross sections 34. As can be seen from completed intermediate product 20 in FIG. 5, the cross section of the distribution line which produces connecting rib 24 is taller than channel 33 serving to produce band 23, for which reason connecting ribs 24 project beyond inside surface 28 of intermediate product 20 visible in FIG. 1 and extend without a break. Connecting ribs 24, which are of uniform width, have an arc-like curvature, which is favorable for the flow of material.

Intermediate product 20, finally, also has radial, transverse webs 36, which project beyond the circular outline of intermediate product 20. These are formed by appropriately designed transverse chambers (not shown) in injection mold 31, 32, which terminate in expanded chamber areas (not shown). Previously mentioned straight wire sections 13 are laid in these transverse chambers up as far as the chamber expansions when heating strand 15 is laid in the mold, as can be derived from FIGS. 3–5. At the same time, contacts 40 are also laid in the chamber expansions, so that, after the injection and solidification of welding material 21, cups 46, visible in FIGS. 1 and 2, are formed at end of transverse webs 36 to hold contacts 40. As can be derived from FIG. 5, straight wire sections 13 pass at a sufficiently high level 38 above wavy heating strand 15; this applies especially to straight section 13 of long transverse web 36, which proceeds from the wavy section of the heating wire of innermost winding 23' of the band shown in FIG. 1. Straight wire section 13 can, as shown in the figure, extend either in the interior of transverse web 36 or on the top surface of this web 36.

In the completed intermediate product, according to FIGS. 1–5, the position of flat wavy shape 11 of heating strand 15 and the position of contacts 40 are established by welding material 21. This intermediate product thus serves as a carrier for the windings of special heating strand 15 and can therefore be described below as the "heating strand carrier". In the flow direction indicated by the arrows in FIG. 1, a flat, in this case ring-shaped, boundary zone 18 is provided inside of inner most winding 23' of the band, based on gate 44 as the center; this zone is formed by a appropriate starting chamber (not shown) in injection mold 31, 32. This starting chamber is supplied with welding material via the previously mentioned distribution lines, which serve to form connecting ribs 24 in heating strand carrier 20. This cross section of this chamber is flatter than overall cross section 34, 30 of channels 33 serving to produce band 23. This is significant for the further processing of heating strand carrier 20 according to the invention in pipe fitting 50 to be obtained, as can be seen on the basis of FIGS. 10 and 11. Central part 49 in FIGS. 1 and 2 is cut out so that flat boundary zone 18 with its circular opening 22 begins there. In the present case, heating strand carrier 20 is a flat, level product. Because of open gaps 25 remaining between windings 23 of the band and connecting ribs 24, heating strand carrier 20 has the character of a mat; it is flexible, and its original flat contour shown in FIGS. 1 and 2 can be easily deformed into a cylinder. This is significant for the following stages of the processing of heating strand carrier 20.

Figure 10:
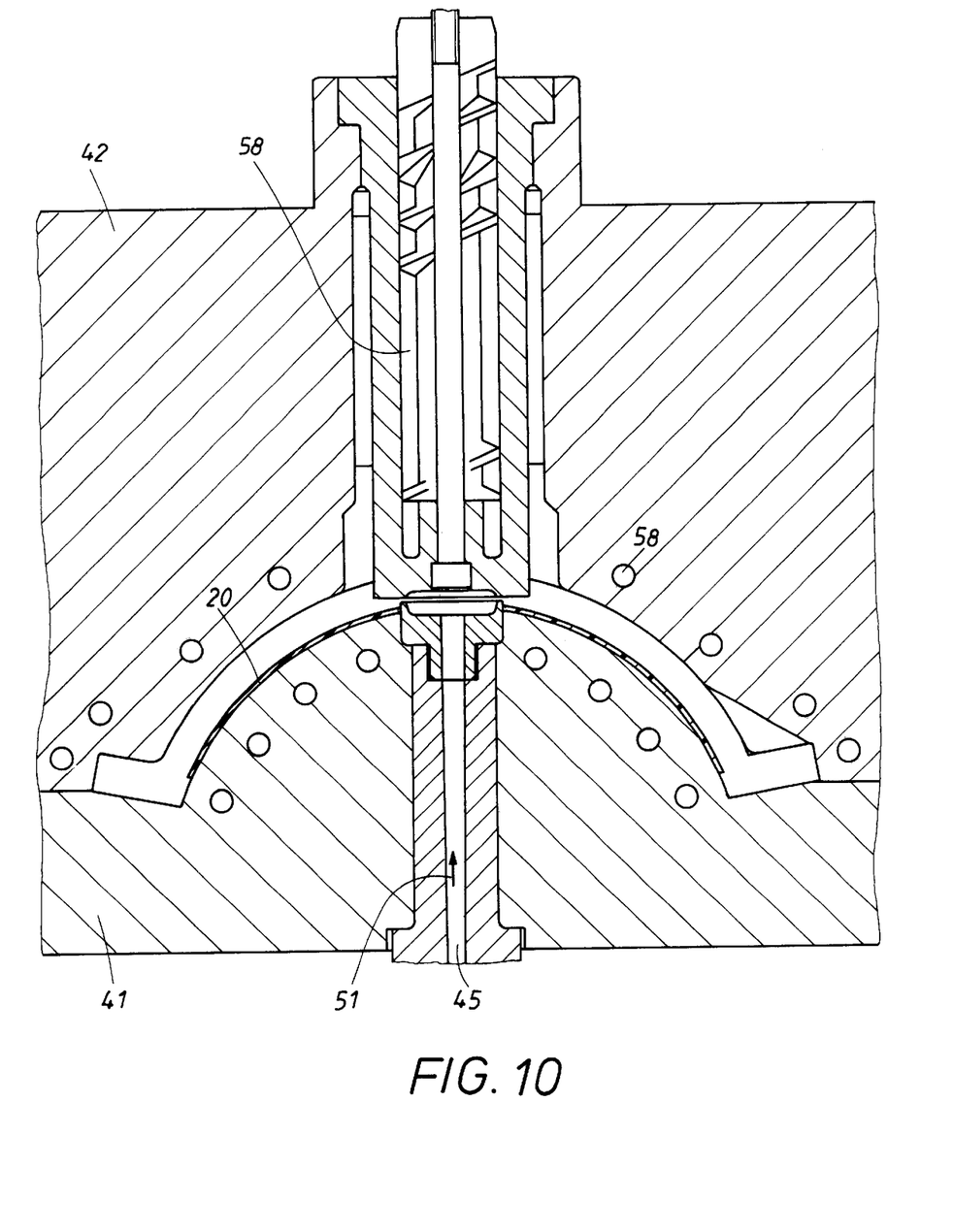
FIG. 10 shows a schematic diagram of a cross section through an additional injection molding device, which holds the intermediate product of FIGS. 1–5 and is used to produce a pipe fitting.
Figure 11:
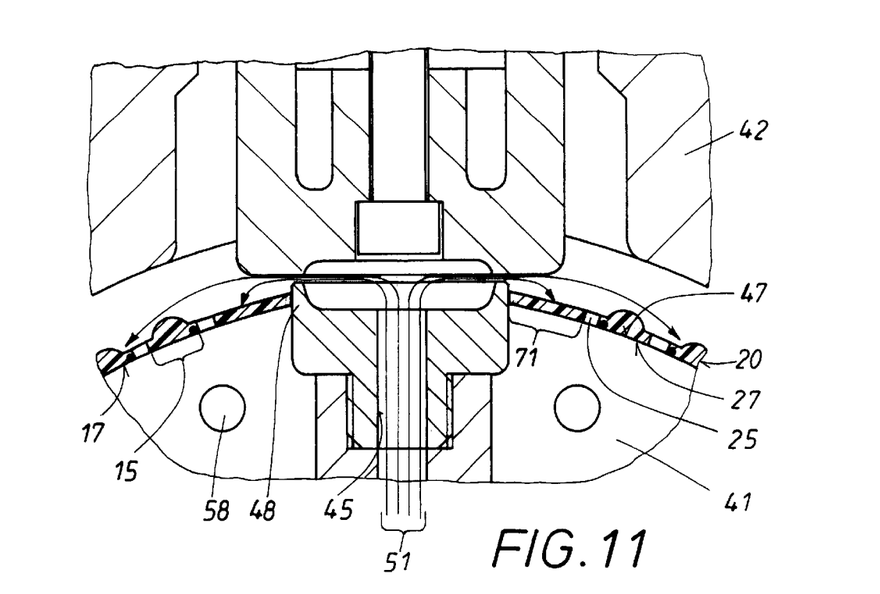
FIG. 11 shows, on an enlarged scale, a part of the device shown in FIG. 10.

To produce pipe fitting 50, a second injection mold 41, 42 shown in FIGS. 10 and 11, is used. It consists of a mold half 41 on the nozzle side, with a nozzle 45 for the introduction of the previously mentioned welding material 51, and a mold half 42 on the ejector side, serving to eject finished pipe fitting 50. The previously produced heating strand carrier 20 of FIGS. 1–5 is first inserted into ejector-side mold half 42 after the injection mold has been opened. Suitable receptacles for projecting contacts 40, previously mentioned, are also provided there. When injection mold 41, 42 is brought into the closed position shown in FIGS. 10 and 11, central circular opening 22 of heating strand carrier 20 is automatically set down onto a nozzle bush 48 of opposite mold half 41, This nozzle bush 48 surrounds central nozzle 45, which supplies the flow of material, and rises above prominent saddle-shaped mold surface 47 of mold half 41. When, as FIG. 11 shows, welding material 51 flows in the direction of the arrows into the cavity between the two mold halves 41, 42, it first arrives at the side of flat boundary zone 71 of heating strand carrier 20 facing away from mold surface 47 and presses outside surface 27 of the boundary zone against saddle-shaped mold surface 47 of mold half 41. The originally flat mat of heating strand carrier 20 is therefore deformed on this saddle surface 47 into a partial cylinder. It is therefore impossible for incoming welding material 51 to pass into circular opening 22 between nozzle bush 48 and flat boundary zone 71 and arrive at outside surface 27 of heating strand carrier 20.

The two mold halves 41, 42 have suitable coolant channels 58 to ensure the rapid solidification of injected welding material 51. After the mold has been opened, it is then possible in the present case to remove previously described end product 50, shown in FIG. 12, by means of a suitable ejector (not shown) from mold half 42. Previously mentioned mold surface 47 of nozzle-side mold half 41 produces previously mentioned contact surface 54 on end product 50. In this area, integrated heating strand carrier 20 with its described outside surface 27 remains free of welding material 51, because this material is able to flow only into remaining gaps 25, which it then closes. The entire outward-facing broad side 17 of heating strand 15, in the form of a wavy line, therefore remains with visible. It would also be possible to use a different injection mold in which heating strand carrier 20 would be formed into a complete cylinder.

It is therefore guaranteed that outward-facing, broad side 17 of wavy shape 11 remains visible on outside surface 27 of intermediate product 20 and thus also at contact surface 54 of end product 50. In practice, wavy shapes 11 actually project slightly beyond outside surface 27, which can be explained by the shrinkage of welding material 51. Exposed wavy shape 11 is very effective at increasing the efficiency of the later welding operation by which pipe fitting 50 is attached to conduit 56. Electrical insulation problems cannot arise, because the lateral surface of conduit 56 to be welded also consists of electrically nonconductive, thermoplastic material.

Figure 13:
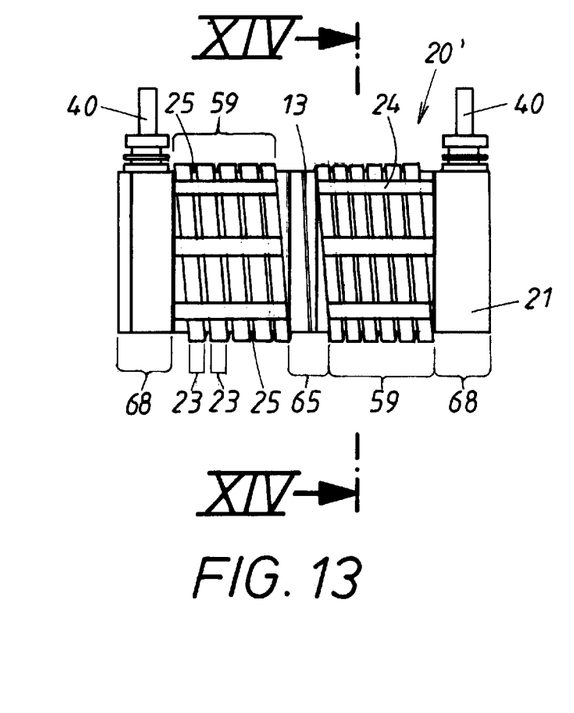
FIG. 13 shows a side view of a different exemplary embodiment of a intermediate product similar to that of FIG. 1.
Figure 14:
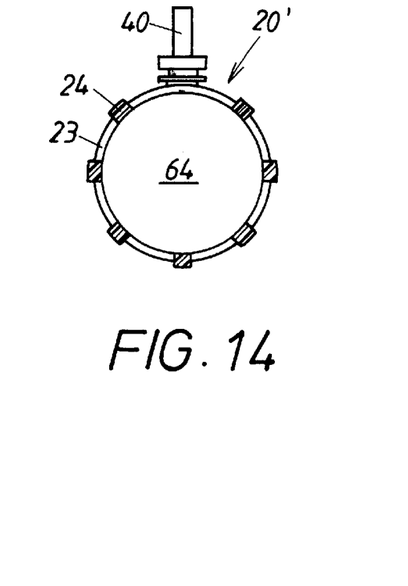
FIG. 14 shows a cross-sectional view of the intermediate product of FIG. 13 along III—III.

FIGS. 13 and 14 show a different exemplary embodiment of a heating strand carrier 20' according to the invention. Elements analogous to those of mat-like heating strand carrier 20 of the preceding exemplary embodiment are designated here by the same reference numbers, for which reason the previous description also applies here to that same extent. It is sufficient to describe only the differences.

One difference consists in that band windings 23 provided here are in the form of a helix from the very beginning and therefore present a completely cylindrical form right in intermediate product 20' itself, as is especially easy to see in FIG. 14. What cannot be seen in FIGS. 13 and 14, is that, of course, the wavy heating strand extends along these band windings 23 in the previously described manner. Individual windings 23 of the band are joined here, too, by connecting ribs 24, which, however, can also be parallel to the axis of the cylinder. This design is presented in the form of two axial cross sections 59 of intermediate product 20', which has the form of a cylindrical basket.

Figure 15:
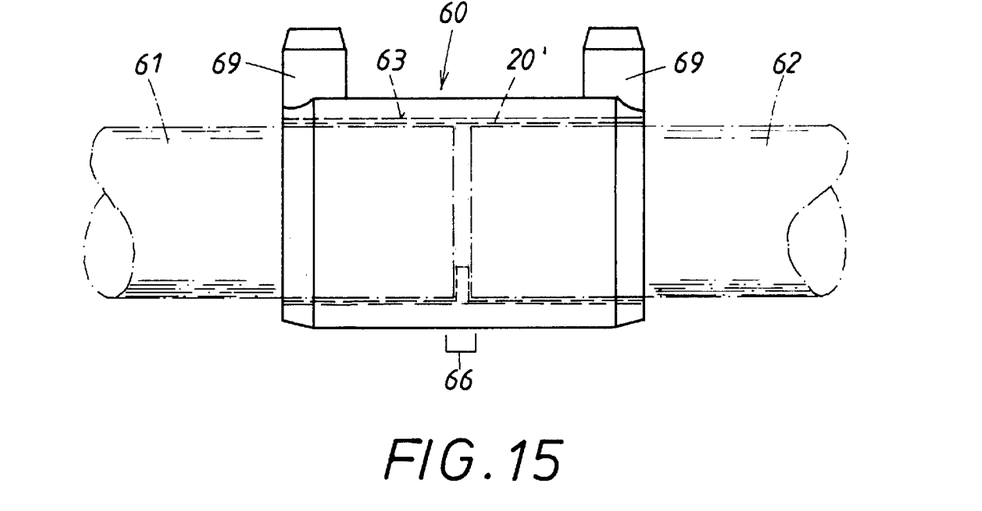
FIG. 15 shows a side view of the end product made from the intermediate product of FIGS. 13 and 14, the figure also showing how the end product is used to join two sections of conduit.

Cylindrical basket 20' thus obtained serves to produce end product 60, shown in a side view in FIG. 15. End product 60 represents in this case a connecting sleeve 60, which is used to connect the ends of two pipes 61, 62 together. During the injection-molding of this connecting sleeve 60, cylindrical basket 20' comes to rest on inside sleeve surface 63 illustrated in FIG. 15, where, in the manner already described in the preceding case, one of the broads side of the wavy shape rests is exposed on the inside 64 of the sleeve. Heating strand 15 used in the present case has three of the straight wire sections 13 explained in conjunction with FIG. 6, two of which, as in the preceding case, serve to connect contacts 40, provided here at the ends of cylindrical basket 20', but which are not visible in FIG. 13. The third wire section 13 is located between the above-mentioned axial sections 59 and is shown in FIG. 13. Here there is a central ring 65, which is produced out of welding material 21 of cylindrical basket 20' and which, in the case of end product 60 of FIG. 15, ends up in the center 66 of the sleeve between the two end surfaces of pipes 61, 62 to be connected.

When FIG. 15 is in service, an inside stop 67, which fixes the position of pipes 61, 62 in the interior of the sleeve, is located between the two end surfaces of pipes 61, 62. This stop 67 could be produced by welding material 21 of cylindrical basket 20'. But it is also possible for stop 67 to be formed later on out of the welding material of connecting sleeve 60, by providing an appropriate opening in central ring 65 and by designed the injection mold for connecting sleeve 60 in a corresponding manner. This opening in central ring 65 is filled up by the welding material of connecting sleeve 60, with the result that inside stop 67 is formed in the interior of the sleeve. Gaps 25 between bands 23 extending around the helix, however, are filled up flush by the welding material of connecting sleeve 60, so that here, too, the wavy lines in tapes 23 remain exposed in interior 64 of the sleeve. Contacts 40 of cylindrical basket 20' in FIG. 13 end up in plastic shoulders 69 of finished connecting sleeve 60 of FIG. 15.

A wavy heating strand 15 could also be used to produce a mat-like intermediate product, which later forms a contact surface of a so-called multi-shell "muff", the shells of which form a complete cylinder which enclose the conduit. In the production of an end product of this type, at least some areas the intermediate product mats used here are formed into more than half-cylinders in the injection mold. The special pattern of the windings of the band in a mat such as this is illustrated in German patent Application No. 196-23,353.4.

List of Reference Numbers 10 heating wire
11 wavy shape
12 wavy section of 15
13 straight section of 15
14 gear wheels for 15
15 heating strand
16 peak area of 11
17 outward-facing broad side of 11
18 inward-facing broad side of 11
19 width of wavy shape 11
20 intermediate product, mat-like heating strand carrier
20' intermediate product, cylindrical basket
21 welding material of 20
22 circular opening in 20 at 18
23 band, windings of the band
23' innermost windings of the band on 20
24 connecting rib between 23, 23'
25 open gap between 23
26 longitudinal corner of band 23
27 outside surface of 20 and 25
28 inside surface of 20
29 width of band
30 partial cross section of 33, receptacle cross section for 15
31 injection mold for 20, first half
32 injection mold for 20, second half
33 channel in 32, channel winding
34 partial cross section of 33, flow cross section
35 distance between 33
36 transverse web of 20
37 mold surface in 31
38 differences in height between 13 and 15
39 channel width of 33
40 contact
41 injection mold for 50, mold half on the nozzle side
42 injection mold for 50, mold half on the ejector side
43 longitudinal bead on 23
44 gate for 24 on 20
45 nozzle on 41
46 cup for 40 (FIGS. 1, 2)
47 saddle-shaped mold surface of 41
48 nozzle bush on 45
49 central part of 20
50 pipe fitting, final product
51 welding material for 50
52 pipe socket on 50
53 saddle of 50
54 contact surface on 53
55 welding area of 50 to 53
56 conduit for 50
57 drilling point for 50 to 56
58 coolant channel in 41, 42
59 axial section of 20', with openings
60 connecting sleeve, pipe fitting, end product
61 first pipe
62 second pipe
63 inside surface of sleeve
64 interior of sleeve of 20'
65 ring of 20' for 13
66 middle of sleeve 60
67 inside stop in 64
68 end ring of 20'
69 shoulder for 40 (FIG. 15)
70 winding of 15 (FIG. 3)
71 flat boundary zone of 20

What is claimed is:

1. A process for producing in an injection mold a pipe fitting having at least some areas consisting of thermally weldable welding material, the pipe fitting configured to be attached to or to connect or repair conduits consisting of thermally weldable material, the method comprising the steps of:

providing channels formed as windings and provided with channel walls in a first injection mold;

giving a wavy shape to at least some sections of a heating wire so as to form a wavy heating strand;

laying the wavy heating strand into the first injection mold between the channel walls of the channels;

introducing a first welding material into the channels so that a first broad side of the wavy shape of the heating strand is pressed against a first mold surface of the injection mold, and producing an intermediate product having the wavy heating strand embedded in the intermediate product and having an outside surface which, in the pipe fitting, will form the contact surface with a conduit, wherein the outside surface is formed by the first mold surface against which the heating strand is pressed and wherein the first broad side of the wavy shape of the heating strand remains visible at the outer surface of the intermediate product;

placing the intermediate product into a second injection mold configured to produce the pipe fitting and positioning the outer surface on a second mold surface of the second injection mold;

introducing a second welding material into the second injection mold for molding the pipe fitting and forming on the second mold surface the contact surface of the pipe fitting for contacting the conduits, wherein the first broad side of the wavy shape of the heating strand remains visible at the contact surface of the end product after solidification of the second welding material.

2. The process according to claim 1, wherein the channel walls of the channel of the first injection mold are undercut, wherein the heating strand laid in the channel has a certain transverse elasticity, and wherein opposite peak areas of the wavy shape press against the undercut channel walls.

3. The process according to claim 1, wherein, in the step of introducing the first welding material into the first injection mold, the welding material is conducted essentially against a second broad side of the wavy shape of the heating strand facing an interior of the channels and the first broad side of the wavy shape of the heating strand is pressed by the flow of the welding material against the first mold surface.

4. The process according to claim 1, wherein the windings of the channels are spaced at a radial distance from one another and the intermediate product is formed in the windings of the channels as a band with adjacent windings having open gaps between the adjacent windings of the band.

5. The process according to claim 4, wherein the wavy shape of the heating strand has a waviness with a width essentially equal to a width of the channels in the injection mold, wherein, in the step of introducing the first welding material, the outer broad side of the wavy shape of the heating strand is pressed toward the outer side of the band and extends over the entire width of the band from one edge of the band to the opposite edge of the band.

6. The process according to claim 4, wherein the channels, in cross section, are divided into two partial cross sections, wherein a first one of the cross sections is an undercut receptacle for the wavy heating strand and is positioned proximal to the first mold surface and acts on opposite peak areas of the wavy shape of the heating strand, and a second one of the cross sections is a flow cross section for conducting a flow of the first welding material, wherein the second cross-section is positioned remote from the first mold surface.

7. The process according to claim 4, wherein the radial distance between the windings of the channels are bridged by one or more distribution lines, wherein at least some of the first welding material flows first into the one or more distribution lines and proceeds from the one or more distribution lines into the individual windings of the channels, wherein the first welding material solidifies in the one or more distribution lines and forms connecting ribs connecting the windings of the band.

8. The process according to claim 7, wherein the distribution lines have a conducting cross section which is taller than a flow cross section of the channels, and wherein, after the introduction and solidification of the first welding material in the distribution lines, the connecting ribs are formed continuously across the windings of the band on an inside surface of the intermediate product opposite the outer surface.

9. The process according to claim 8, wherein the distribution lines and the connecting ribs are arc-shaped.

10. The process according to claim 4, wherein, in the step of. introducing the first welding material into the first injection mold, the first welding material is introduced through a gate and wherein the distribution lines extend away from the gate.

11. The process according to claim 4, wherein, in the step of giving a wavy shape to at least some sections of the heating wire, intermediate sections are left undeformed between the sections of the wavy shape and the intermediate sections are straight wire sections, wherein the first injection mold has transverse chambers extending above the windings of the channels and provided with terminal chamber expansions, wherein, before the step of introducing the first welding material, the straight wire sections are laid in the transverse chambers so as to cross over the wavy sections of the heating strand at a vertical distance, wherein the free ends of the straight wire sections having associated contacts are laid into the terminal chamber expansions, and wherein the first welding material flows into the transverse chambers and the terminal chamber expansions to form a transverse web with a terminal contact after solidification of the first welding material.

12. The process according to claim 11, wherein the transverse chambers have a chamber cross section rising above the cross section of the distribution lines, and wherein the transverse webs produced after solidification of the first welding material on the inner surface of the intermediate product are higher than the connecting ribs.

13. The process according to claim 2, wherein, seen in the flow direction of the first welding material, a starting chamber is provided in the first injection mold upstream of a first one of the windings of the channel, wherein the cross section of the starting chamber is flatter than the cross section of the channels, wherein, after solidification of the first welding material in the starting chamber, a flat boundary zone is produced on the intermediate product which is situated before a first winding of the band.

14. The process according to claim 13, wherein a first mold half of the second injection mold has a nozzle surrounded by a nozzle bush and configured to introduce the second welding material, wherein the flat boundary zone of the intermediate product is set down onto the nozzle bush such that the inside surface of the intermediate product faces an opening in the nozzle, wherein a flow of the second welding material arrives first at the flat boundary zone of the intermediate product and thereafter flows into adjacent windings of the-band and causes the outer surface of the intermediate product to be pressed against the second mold surface of the second injection mold provided on the first mold half.

15. The process according to claim 14, wherein the intermediate product is laid into the second mold half of the second injection mold opposite the first mold half, the second mold half being used to eject the finished pipe fitting (50), and is automatically pushed onto the nozzle bush of the first mold half when the first and second mold halves of the second injection mold are closed.

16. The process according to claim 4, wherein the intermediate product is a heating strand carrier formed as a flat mat and wherein the band in which the wavy heating strand is received is laid out as windings of a monofilar or bifilar spiral.

17. The process according to claim 16, wherein the mat is formed into a partial or complete cylinder in the second injection mold.

18. The process according to claim 16, wherein the mat is a circular disk.

19. The process according to claim 1, wherein the intermediate product is formed in the windings of the channels as a band with adjacent windings, wherein the intermediate product is a heating strand carrier in the form of a cylinder, wherein at least some of the windings of the band form a helix and a cylindrical basket, wherein the cylindrical basket is formed in the second injection mold to a pipe collar or a pipe-connecting or repair sleeve with an inside surface, wherein the first broad side of the wavy shape of the heating strand is freely exposed.

* * * * *